June 5, 1962 — S. R. PHILLIPS — 3,037,803

TRAVELING BLOCK WITH VARIABLE AIR SPRING

Filed Dec. 12, 1958

INVENTOR.
SAMUEL R. PHILLIPS
BY *Charles F. Olzzard*
ATTORNEY

United States Patent Office 3,037,803
Patented June 5, 1962

3,037,803
TRAVELING BLOCK WITH VARIABLE AIR SPRING
Samuel R. Phillips, Houston, Tex., assignor to Joy Manufacturing Company, Pittsburgh, Pa., a corporation of Pennsylvania
Filed Dec. 12, 1958, Ser. No. 780,153
6 Claims. (Cl. 294—82)

This invention relates to a traveling block and more particularly to an improved adjustable spring device for the load receiving hook and which is adjustable at will to compensate for varying loads on the hook while the traveling block is in operation.

In traveling blocks such as are used with oil well drilling equipment the block structure usually embodies a coiled spring mounting for the load carrying hook and usually the coil spring structures cannot be adjusted to compensate for varying hook loads while the traveling block is in use. The present invention contemplates improvements over known types of traveling block designs in that the novel expansible chamber fluid spring device or so-called air spring can readily be adjusted to compensate for varying hook loads while in use simply by varying the pressure in the fluid chamber thereof. Other improvements consist of compactness, simplicity and ruggedness in design.

An object of the present invention is to provide an improved traveling block, especially but not exclusively, designed for use with oil well drilling equipment. Another object is to provide an improved adjustable spring device for the load receiving member of a traveling block. A further object is to provide an improved traveling block having a novel expansible chamber fluid spring device or so-called air spring which is adjustable at will for receiving varying loads while in use thereby to meet varying operating conditions such as varying loads on the load carrying hook of the block. A still further object is to provide an improved adjustable resilient mounting for the load receiving hook of a traveling block and embodying novel means whereby the resilient mounting may be adjusted at will while the block is in use. Yet another object is to provide an improved compressible fluid spring mounting for a load carrying member. These and other objects and advantages of the invention will, however, hereinafter more fully appear.

In the accompanying drawings there is shown for purposes of illustration one form which the invention may assume in practice.

Figure 1:
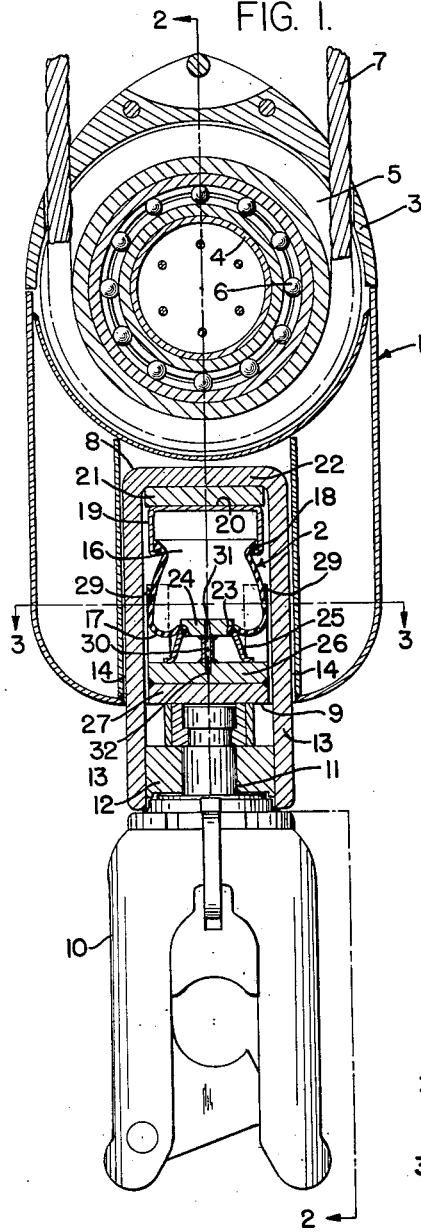
FIG. 1 is a longitudinal section through a traveling block in which a preferred illustrative form of the invention is embodied.

In this illustrative construction, as shown in the drawings, the improved traveling block has a load carrying hook which may be of a conventional design. The improved traveling block is generally designated 1 and the improved adjustable spring device enclosed within the block structure is generally designated 2.

The traveling block comprises a body 3 supporting a horizontal tubular cylindrical support 4 on which coaxial sheaves 5 are freely rotatably mounted as by antifriction bearings 6 interposed between the sheaves and the tubular bearing support. Engaging these sheaves are strands 7 of the cable of a hoisting mechanism as for example the cable of the draw-works of the conventional oil well drilling equipment. Evidently, the improved traveling block structure may be associated with other kinds of equipment such as cranes to help dampen shock loads. Also the improved adjustable spring device may be used with devices other than a traveling block.

Figure 3:
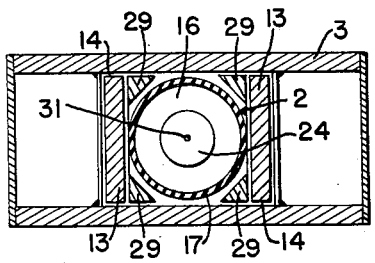
FIG. 3 is a cross section taken on line 3—3 of FIG. 1 showing details of the improved air spring structure.

In this improved construction formed within the body 3 is an inverted U-shaped frame 8 which cooperates with a U-shaped frame portion 9 of the block body 3. The inverted U-shaped frame 8 is desirably arranged between the parallel side portions of the U-shaped frame 9, in the manner shown. The spring device 2 is arranged between the cross portions of these U-shaped frame portions and suspended from the inverted U-shaped frame 8 is the legs of the load carrying hook designated 10 which is swivelly mounted at 11 on a block 12 secured to the lower ends of the legs or parallel side portions 13 of the inverted U-shaped frame 8 as shown. As shown in FIG. 3, the body 3 of the block is generally rectangular in cross section and the side portions 13 of the inverted U-shaped frame 8 extend vertically through rectangular openings 14 within the block body.

Figure 2:
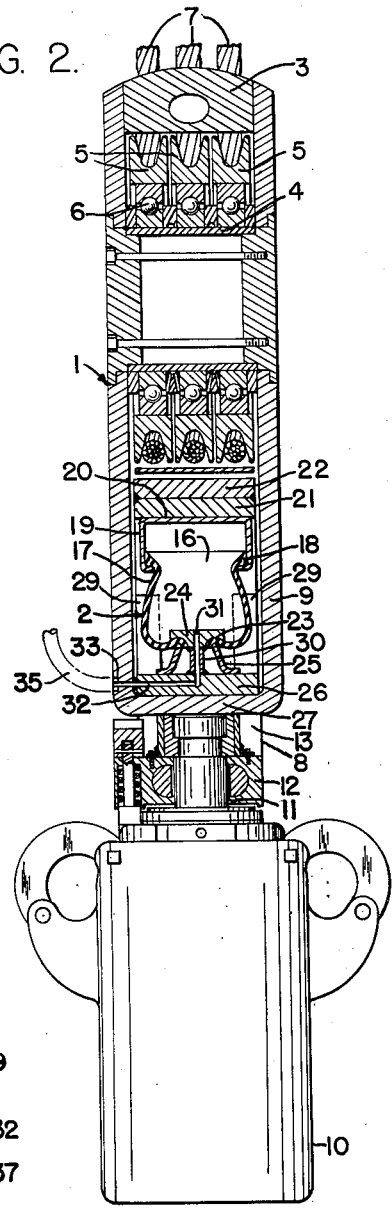
FIG. 2 is a longitudinal section taken on line 2—2 of FIG. 1.
Figure 4:
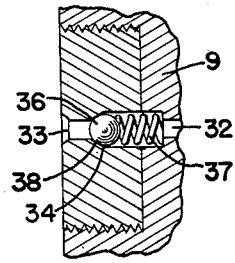
FIG. 4 is an enlarged detail section of the charging valve.

Now referring to the detail structure of the improved expansible chamber fluid spring 2 it will be noted that an expansible chamber 16 is provided within an expansible air type spring namely an expansible bag 17 and this bag is flexible and is desirably composed of a resilient rubber-like substance. The bag at its upper portion is provided with an upper ring 18 secured within an inverted cup-like member 19 having a plane upper surface abutting at 20 a horizontal reinforcing plate 21 secured, as by welding, to the upper cross portion 22 of the inverted U-shaped frame 8. The lower portion of this flexible bag is sealingly engaged at 23 with a circular cap member 24 secured to an inverted tapered sleeve 25 engaging the upper surface of a horizontal reinforcing plate 26 secured, as by welding, to the lower cross portion 27 of the U-shaped portion 9 of the block body. The minimum height of the air bag, i.e. the amount of collapse of the bag, is limited by four upright spacers 29 (FIGS. 1 and 2) of triangular cross section (FIG. 3) secured as by welding to the square plate 26 of the block frame 9. The spacers 29 are arranged in the space between the circular air bag and the plate 26 and at their upper ends provide stops for limiting downward movement of the plate 21 of the frame structure 8. Extending axially through the cap member 24 and a tubular element 30 secured between the member 24 and the plate 26 is a fluid passage 31 which communicates with a lateral fluid passage 32 formed in the plate and within a side portion of the U-shaped body portion 9 as shown in FIG. 2. Connectible at 33 to a suitable valve 34 is a detachable fluid connection or hose line 35 which may lead to any suitable supply of gaseous fluid under pressure, as for example an air pressure storage tank or air compressor discharge. The valve 34 may assume any suitable form but herein is shown in FIG. 4 as a check comprising a ball valve 36 held by a spring 37 against a seat 38 and normally preventing flow of air under pressure from the air bag to atmosphere but permitting flow into the bag. Evidently, if desired, a manually controlled valve may be employed.

During use of the improved traveling block the varying loads on the load receiving hook 10, as for example the varying weights of the drill pipe used in drilling a well, may cause the flexible rubber-like bag of the air spring to be compressed, building up the fluid pressure therein as the load on the hook lowers the inverted U-shaped frame 8 relative to the U-shaped frame portion 9 of the block body suspended from the cable of the draw-works, and the gaseous fluid within the air spring may under certain conditions serve to cushion or absorb the shock loads transmitted to the load receiving hook particularly when the block is used with crane type equipment. When it is desired to vary the spring pressure i.e. to vary the gaseous pressure within the expansible chamber of the air bag this may be accomplished at will simply by attaching the hose line 35 to the valve connection 34 to supply additional fluid under pressure to the air bag or if it is desired the valve may be operated to lower the pressure within the air bag simply by venting the desired amount of pressure therefrom. The air spring allows a variation in spring rate as well as preload, as is evident.

As a result of this invention an improved traveling block is provided, especially, but not exclusively, designed for use with oil well drilling equipment, having a novel adjustable spring mounting for the load carrying hook and adjustable at will to compensate for varying hook loads during use of the traveling block. By the provision of the expansible chamber gaseous fluid spring device it is possible to vary the gaseous pressure therein at will while the traveling block is in operation. The novel resilient rubber-like bag and its associated elements and novel mounting means not only provides for ready adjustability but also compactness, ruggedness and simplicity. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A traveling block comprising a body member, a U-shaped frame member mounted on said body member and dependent therefrom, an expansible air spring device mounted in said U-shaped member, said spring device having a top expansible portion and a lower portion wherein said lower portion is secured to the U-shaped frame member, a cross plate secured to said top portion of said expansible air spring device for movement therewith, a pair of leg members secured to said cross plate and dependent therefrom, a hook member secured to the lower portion of said pair of leg members for movement therewith, and means for varying the spring force in said expansible air device.

2. A traveling block as set forth in claim 1 wherein said hook member has a swivel connection with said pair of leg members.

3. A traveling block as set forth in claim 2 wherein said spring device comprises an expansible fluid chamber and said means for varying the spring force comprises a detachable fluid connection with said fluid chamber.

4. A traveling block as set forth in claim 3 wherein said expansible fluid chamber is a flexible rubber-like bag, fluid passage means communicating with said bag's interior, and said fluid passage having other means for connection with said detachable connection.

5. A traveling block comprising a body member, a U-shaped frame member mounted on said body member, said frame member consisting of two vertical dependent leg members connected to said body member and a first cross member connecting said leg members, an expansible air spring device mounted in said U-shaped member, said spring device having a top expansible portion and a lower portion, said lower portion is secured to said first cross member, a second cross member secured to said top portion of said air spring device, said second cross member constrained to move in a rectilinear path as defined by the opening in said U-shaped member, dependent leg members secured to said second cross member, a hook member secured to said dependent leg members for movement therewith, and means for varying the spring force in said expansible air device.

6. A traveling block comprising a body member, a U-shaped frame member mounted on said body member, an expansible air spring device mounted in said U-shaped member, an inverted U-shaped member mounted on said expansible air spring device, means for varying the spring force within said expansible air spring device for moving said inverted U-shaped member, a hook member secured to said inverted U-shaped member for movement therewith.

References Cited in the file of this patent

UNITED STATES PATENTS

| | | |
|---|---|---|
| 608,344 | Nesmith | Aug. 2, 1898 |
| 2,585,408 | Roberson | Feb. 12, 1952 |
| 2,590,362 | Bennett | Mar. 25, 1952 |
| 2,787,475 | Jackson | Apr. 2, 1957 |